(12) United States Patent
Takada (10) Patent No.: US 8,125,676 B2
(45) Date of Patent: Feb. 28, 2012

(54) STICKY NOTE PRINTING SYSTEM AND PRINTER THAT PRINTS BASED ON ROTATED IMAGE DATA

(75) Inventor: Makoto Takada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 921 days.

(21) Appl. No.: 12/043,804

(22) Filed: Mar. 6, 2008

(65) Prior Publication Data

US 2008/0225319 A1    Sep. 18, 2008

(30) Foreign Application Priority Data

Mar. 15, 2007  (JP) ................................ 2007-067059

(51) Int. Cl.
*G06K 15/00* (2006.01)
(52) U.S. Cl. ..................................... 358/1.18
(58) Field of Classification Search .................. 358/1.1, 358/1.8; 400/61
See application file for complete search history.

(56) References Cited

U.S. PATENT DOCUMENTS 5,344,247 A * 9/1994 Sakuragi et al. .............. 400/582
2005/0025546 A1 * 2/2005 Wessells .......................... 400/61

FOREIGN PATENT DOCUMENTS

JP    2003-212367    7/2003

* cited by examiner

*Primary Examiner* — Benny Q Tieu
*Assistant Examiner* — Jeremiah Bryar
(74) *Attorney, Agent, or Firm* — DLA Piper LLP (US)

(57) ABSTRACT

A sticky note printing system has: a sticky note printer which prints on a topmost sticky note of a bundle of sticky notes formed by laminated sticky notes, of which one ends are glued to be peeled off each other; and an image forming apparatus which forms an image data to be printed on the sticky note. The sticky note printer prints on the sticky note based on the image data formed by the image forming apparatus. The image forming apparatus has an image forming device which forms the image data. The sticky note printer has an image rotation device which rotates the formed image data by a predetermined angle and a printing device which prints based on the image data rotated by the image rotation device.

7 Claims, 12 Drawing Sheets

PHONE MSG MEMO

TO: ___________

CALLED

FROM: ___________

☐ PLEASE CALL BACK

TEL ___________

☐ MSG
___________
___________

MM   DD   HH   MIN         TAKADA

FIG. 7B

PHONE MSG MEMO

TO: ___________

CALLED

FROM: ___________

☐ PLEASE CALL BACK

TEL ___________

☐ MSG
___________
___________

MM   DD   HH   MIN         TAKADA

F I G. 7 C

PHONE MSG MEMO

TO: ___________

CALLED

FROM: _________________

☐ PLEASE CALL BACK

TEL ___________________

☐ MSG
___________________
___________________

MM  DD  HH  MIN      TAKADA

15

F I G. 7 D

PHONE MSG MEMO

TO: ___________

CALLED

FROM: _________________

☐ PLEASE CALL BACK

TEL ___________________

☐ MSG
___________________
___________________

MM  DD  HH  MIN      TAKADA

STICKY NOTE PRINTING SYSTEM AND PRINTER THAT PRINTS BASED ON ROTATED IMAGE DATA

The entire disclosure of Japanese Patent Application No. 2007-067059, filed Mar. 15, 2007, is expressly incorporated by reference herein.

BACKGROUND

1. Technical Field

The present invention relates to a sticky note printing system which prints on a topmost sticky note of a bundle of sticky notes, and a sticky note printer.

2. Related Art

There is a known printer, as a kind of sticky note printer above, in which a topmost sticky note on a bundle of sticky notes set in the printer is flipped (or turned over) one by one, the flipped sticky note is peeled off from the rest of the sticky notes, and is printed thereon. JP-A-2003-212367 is an example of related art. The bundle of sticky notes has a fixed end (a glued portion) at one end thereof being glued.

Here, for example, in a case that the sticky note is posted with a free end thereof being protruded on a right page of a center-page spread of a magazine, etc., and in a case that the sticky note is posted with the free end thereof being protruded on a left page are compared, using two of the sticky notes on which the same image are printed. At this time, the image of the sticky note posted on the right page is set in a normal read position, whereas the image of the sticky note posted on the left page is set in an upside down read position. In fact, when a posted position is changed (rotated), a read position of the image is changed (rotated) according to the posted position of the sticky note.

SUMMARY

An advantage of some aspects of the invention is to provide a sticky note printing system and a sticky note printer capable of printing an image by matching a read position of the image printed on a sticky note with a posted configuration of the sticky note.

According to an aspect of the invention, there is provided a sticky note printing system having: a sticky note printer which prints on a topmost sticky note of a bundle of sticky notes formed by laminated sticky notes, of which one ends are glued to be peeled off each other; and an image forming apparatus which forms an image data to be printed on the sticky note; and the sticky note printer prints on the sticky note based on the image data formed by the image forming apparatus. The image forming apparatus has an image forming device which forms the image data. The sticky note printer has: an image rotation device which rotates the formed image data by a predetermined angle and a printing device which prints based on the image data rotated by the image rotation device.

According to another aspect of the invention, there is provided a sticky note printing system having: a sticky note printer which prints on a topmost sticky note of a bundle of sticky notes formed by laminated sticky notes, of which one ends are glued to be peeled off each other; and an image forming apparatus which forms an image data to be printed on the sticky note; and the sticky note printer prints on the sticky note based on the image data formed by the image forming apparatus. The image forming apparatus has an image forming device which forms the image data and an image rotation device which rotates the formed image data by a predetermined angle. The sticky note printer has a printing device which prints based on the image data rotated by the image rotation device.

According to another aspect of the invention, there is provided a sticky note printer having: an image forming device which forms an image data to be printed on a topmost sticky note of a bundle of sticky notes formed by laminated sticky notes, of which one ends are glued to be peeled off each other; an image rotation device which rotates the formed image data by a predetermined angle; and a printing device which prints based on the image data rotated by the image rotation device.

According to this configuration, it is possible to rotate the image data formed by the image forming device by the image rotation device. Therefore, even if the posted position of the sticky note is changed (rotated), it is possible to cause a read position of a printed image to be in a normal read position, by rotating the image data before printing and by printing on the sticky note based on the rotated image data. In other words, it is possible to match the read position of the printed image to be printed on the sticky note with the posted configuration of the sticky note for printing.

In these cases, it is preferable that a rotational angle setting device is provided which sets a rotational angle of the image data rotated by the image rotation device.

According to this configuration, as it is possible to set a desired rotational angle, the read position of the printed image can be arbitrary changed in accordance to the posted position of the sticky note. Note that, in a case of the sticky note printing system, the rotational angle setting device may belong to the image forming apparatus or to the sticky note printer.

In this case, it is preferable that the rotational angle setting device sets a printed position of a printed image to be printed based on the image data at an angle of 0 degree, 90 degrees, 180 degrees, or 270 degrees as the rotational angle with respect to a set position of the sticky note set in the sticky note printer, and the bundle of sticky notes is formed approximately square in plan view.

According to this configuration, it is possible to avoid that the printed image protrudes out of the sticky note and to print the printed image in the sticky note, even if the image data is rotated. In this case, it is preferable that the above angles are selectably displayed in which the angles are related to four images showing posted positions of the sticky note rotated by 90 degrees one from the other without changing (rotating) the read position of the printed image, thereby the posted position of the sticky note and the read position of the printed image being easily recognized.

In this case, it is preferable that the sticky note printer further has a storage portion which stores and saves the image data.

According to this configuration, it is possible to store and save the formed image data in the storage portion. Therefore, when the sticky notes are printed based on the same image data, as the sticky notes are printed based on the stored and saved image data, there is no need to form a new image data.

BRIEF DESCRIPTION OF THE DRAWING

The invention will be described with reference to the accompanying drawings, wherein like numbers reference like elements.

DESCRIPTION OF EXEMPLARY EMBODIMENTS

Hereinafter, a description will now be made about a sticky note printing system with referring to drawings according to embodiments of the invention. The sticky note printing system prints on a sticky note with a sticky note printer based on an image data formed with a personal computer, and ejects the sticky note printed thereon outside the printer.

Figure 1:
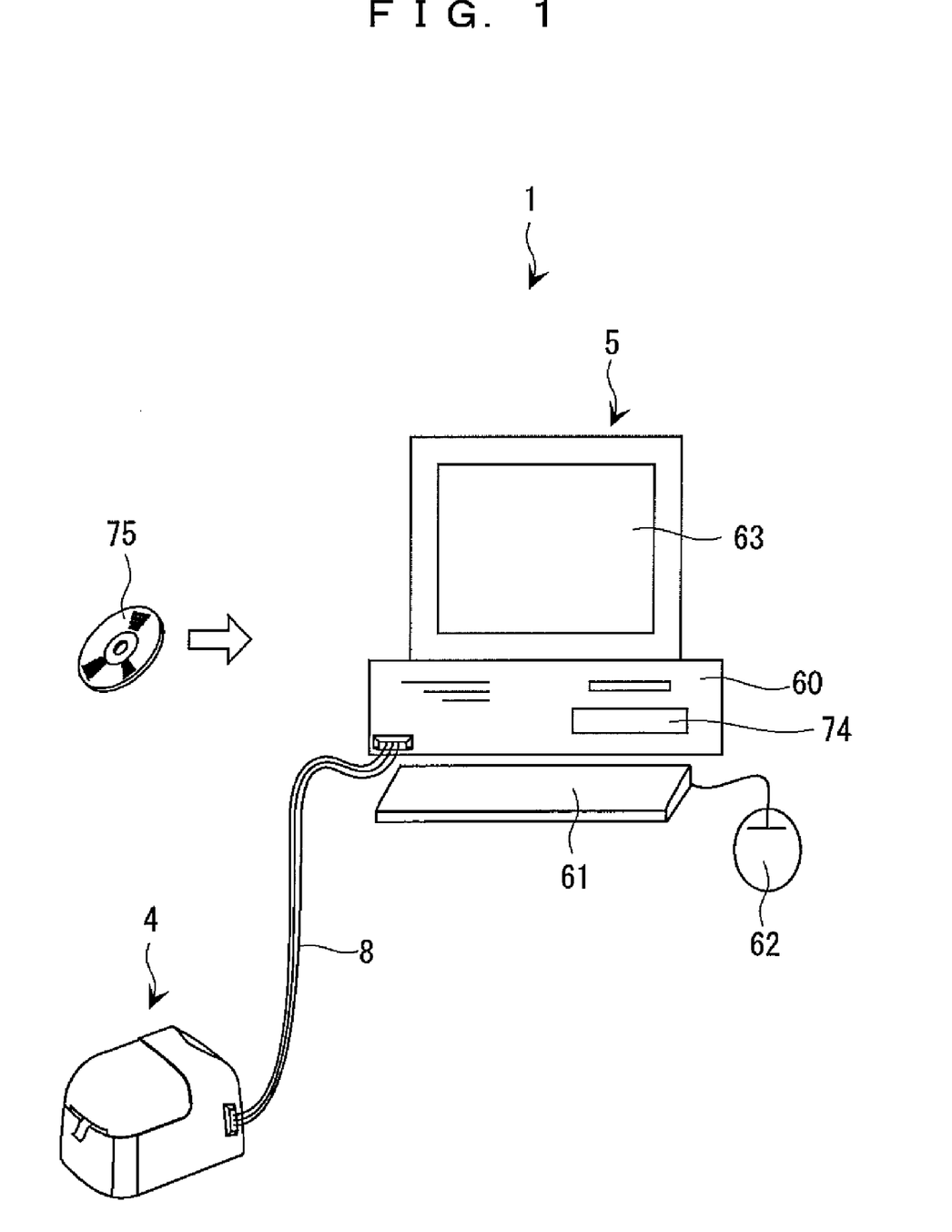
FIG. 1 is a schematic arrangement showing a sticky note printing system according to the first embodiment.

As shown in FIG. 1, a sticky note printing system 1 includes a sticky note printer 4 having a bundle of sticky notes H set and a personal computer 5 which is connected to the sticky note printer 4 via a USB cable 8, etc., and which forms and edits an image data to be printed on a sticky note H1. In other words, the sticky note printing system 1 forms the image data with the personal computer 5, transmits the image data to the sticky note printer 4, and prints the image on the sticky note H1 based on the transmitted image data with the sticky note printer 4.

Figure 2:
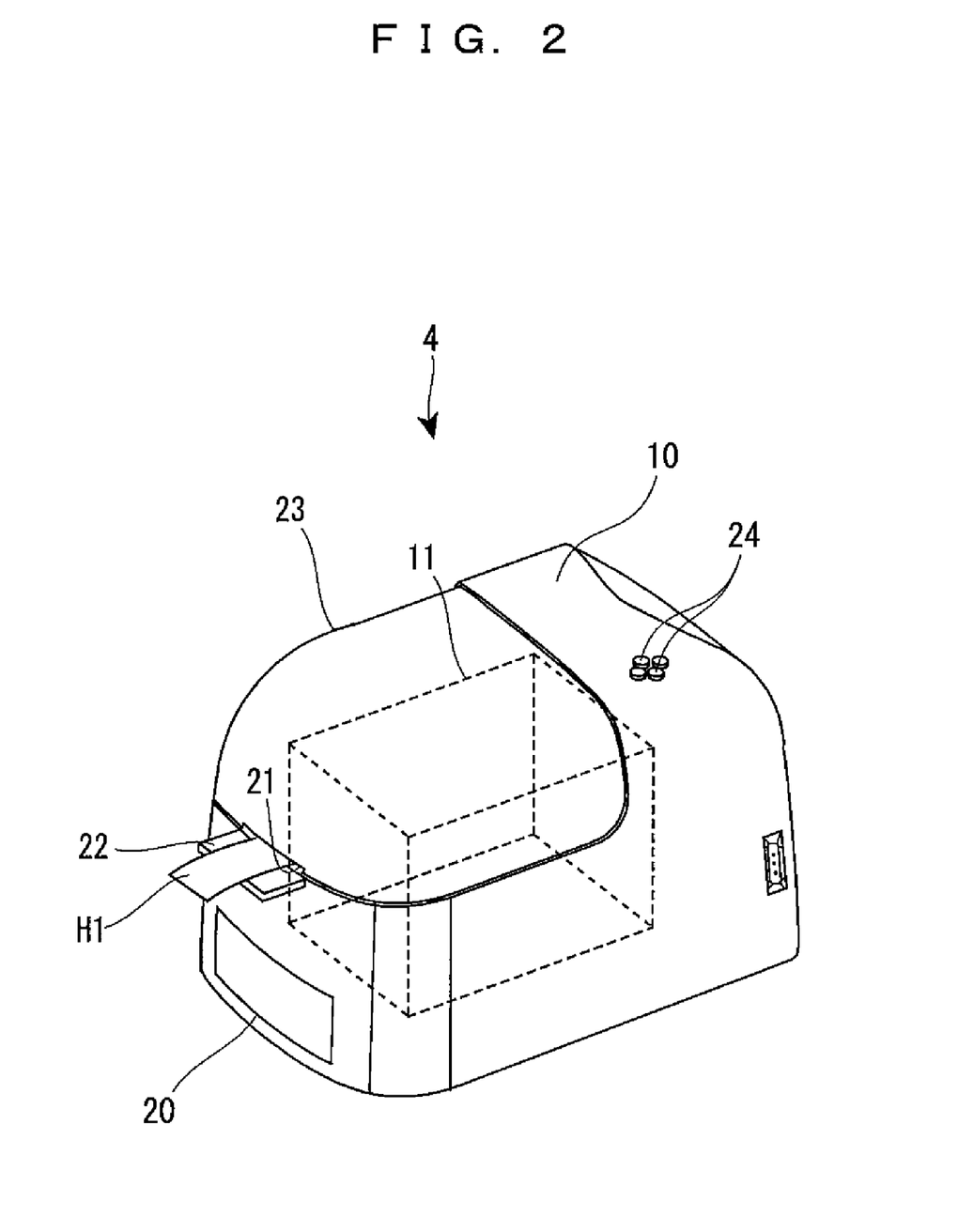
FIG. 2 is an appearance perspective view of a sticky note printer.

As shown in FIG. 2, the sticky note printer 4 has: an apparatus casing 10 which forms an outer shell; four rotational angle setting buttons (rotational angle setting devices) 24 provided on the apparatus casing 10; and a printing assembly (a printing device) 11 which is accommodated in the apparatus casing 10 and which prints after the sticky note H1 is peeled off from the bundle of sticky notes H set in the apparatus casing 10. A controller 12 controls driving of the above devices.

A plurality of sticky notes H1 is laminated to form the bundle of the sticky notes H. The plurality of sticky notes H1 are approximately square in plan view of which base portions on reverse surfaces are partially glued (see FIG. 4). Each of the sticky notes H1 is peeled off one by one from the bundle of the sticky notes H, and, after peeled off, it is posted on a notebook, etc., with a glued portion 15 of the base portion (see FIG. 7).

The apparatus casing 10 is manufactured in a compact size as a whole and has a tray introducing opening 20 at the lower front face thereof, through which a sticky note tray 30 is introduced in the apparatus casing 10 from the front in a drawer manner. The apparatus casing 10 has an ejecting slot 21 and a receiving part 22 at the upper center of the front face. The ejecting slot 21 is in a slit-like form horizontally from which a printed sticky note H1 is ejected outside the apparatus casing 10. The receiving part 22 extends from the inside of the apparatus casing 10 to the outside thereof though the ejecting slot 21 so as to receive the peeled off and printed sticky note H1. Also, an opening/closing lid 23 is provided for attaching/detaching a ribbon cartridge 34 and maintenance at the top face of the apparatus casing 10. Further, four rotational angle setting buttons 24 are provided for setting a rotational angle for an image to be printed on the sticky note H1 at the rear right side on the top face of the apparatus casing 10.

Figure 3:
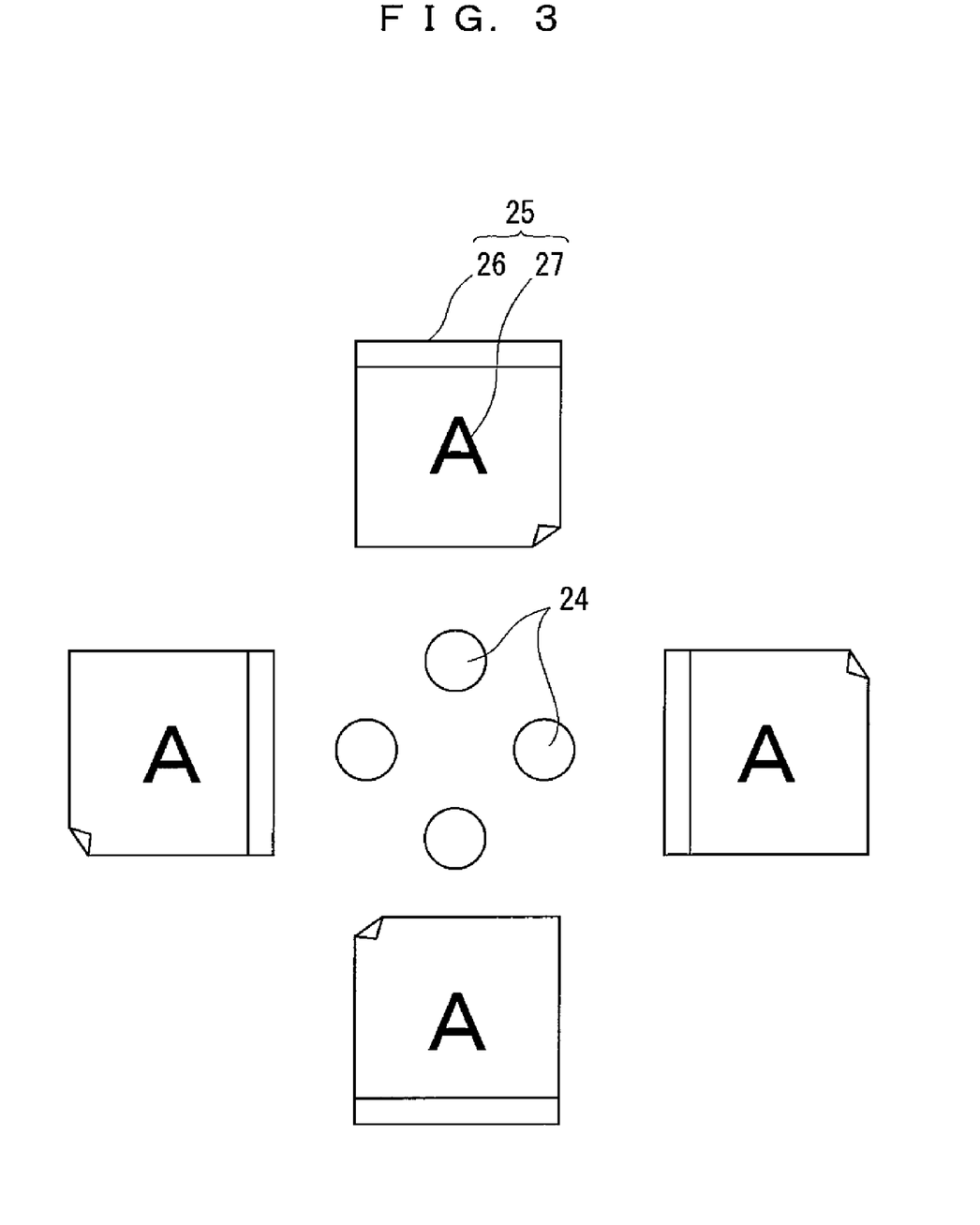
FIG. 3 is a schematic arrangement of rotational angle setting buttons.

As shown in FIG. 3, the four rotational angle setting buttons 24 are located at the top, the down, the left and the right, respectively, each of which also serving as a printing button. That is, by depressing each of the rotational angle setting buttons 24, the image data is rotated at a desired angle and a printing is performed on the sticky note H1 based on a rotated image data (details will be explained later). Four marks (image pictures) 25 are shown which are to be printed on the sticky note H1 at the outside the respective rotational angle setting buttons 24. Each of the marks 25 includes a sticky note mark 26 showing a posted position corresponding to each of the rotational angle setting buttons 24 and an image mark 27 arranged so as to be in a normal read position with reference to the sticky note mark 26. It is easily possible to select the sticky note H1 in a desired posted position by a user's visual check for the each mark 25.

Figure 4:
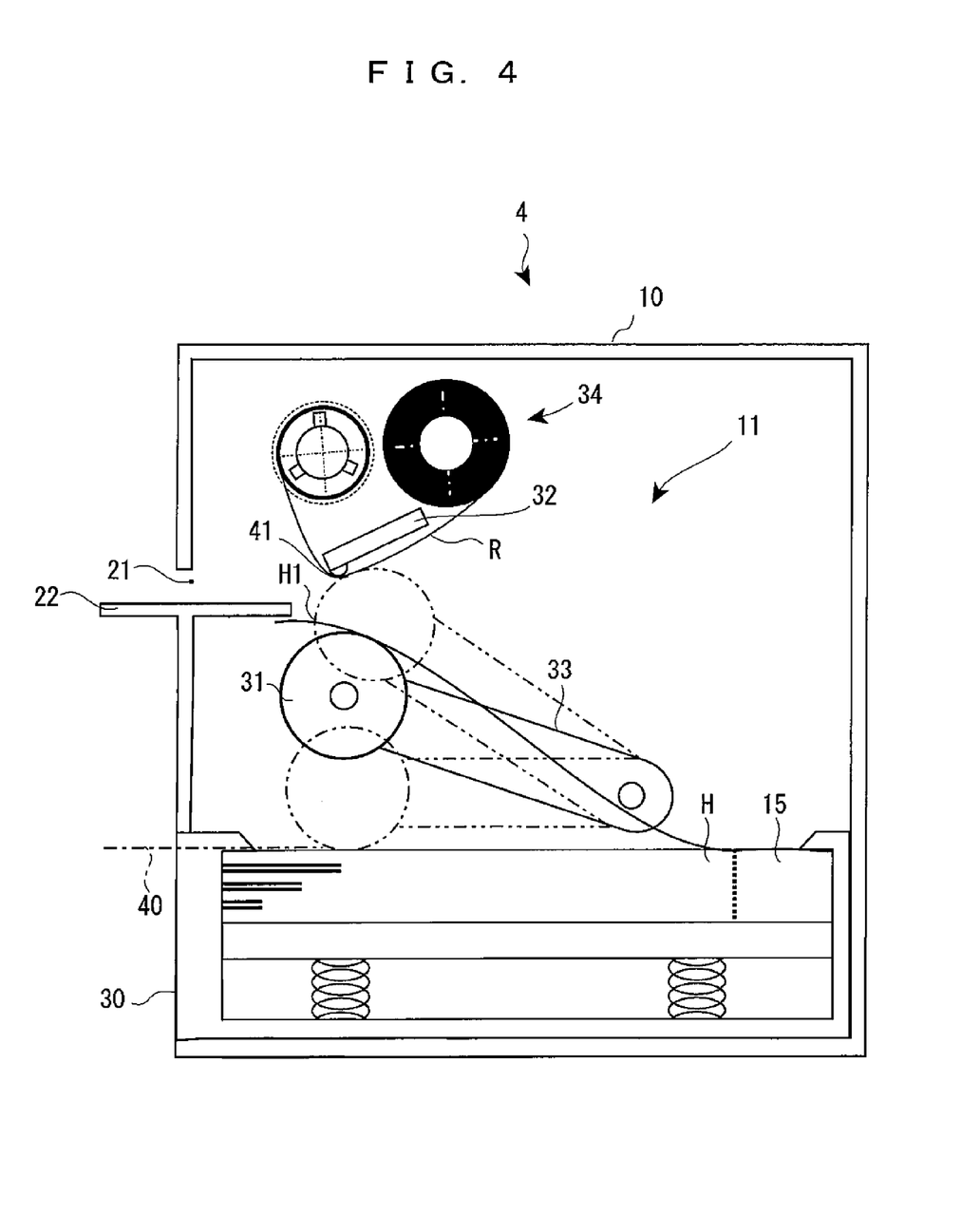
FIG. 4 is an internal schematic diagram of the sticky note printer.
Figure 5:
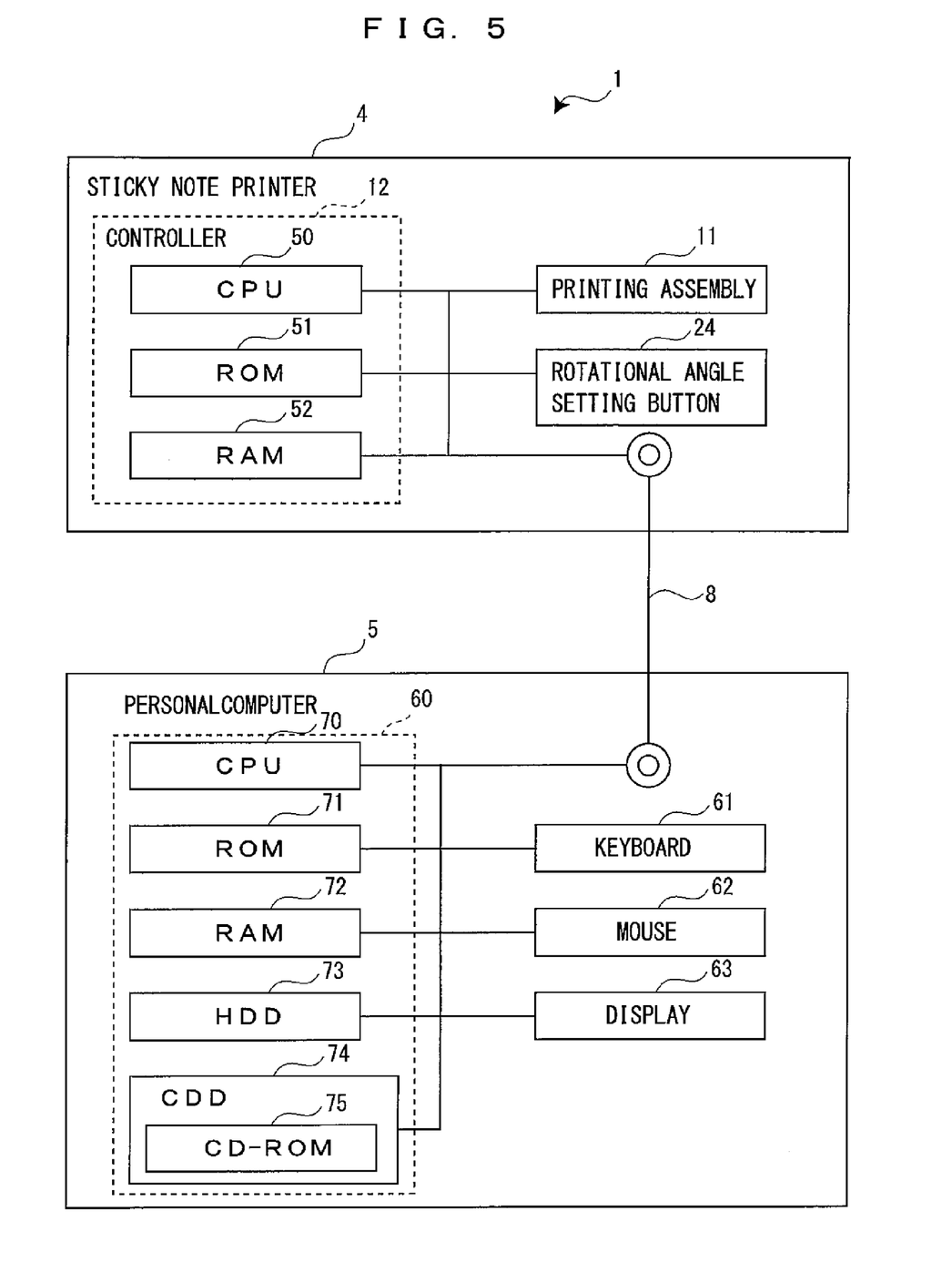
FIG. 5 is a control block diagram of the sticky note printing system.

As shown in FIGS. 4 and 5, the sticky note printer 4 has the printing assembly 11, the controller 12 and the rotational angle setting buttons 24. The printing assembly 11 has: the sticky note tray 30 which sets the bundle of sticky notes H; a pick-up roller 31; a thermal head 32; a roller arm 33; and the ribbon cartridge 34 accommodating an ink ribbon R. The pick-up roller 31 peels off the topmost sticky note H1 to eject after rolling up the sticky note H1 of the bundle of sticky notes H set up to a roll-up position 40. The thermal head 32 prints on the sticky note H1 transmitted by the pick-up roller 31. The roller arm 33 moves the pick-up roller 31 between the roll-up position 40 and a printing position 41 where the pick-up roller 32 is in contact with the thermal head 32. In other words, the pick-up roller 31 also serves as a platen roller facing the thermal head 32.

In the printing assembly 11 constituted like this, the pick-up roller 31 rolls up the topmost sticky note H1 on the bundle of sticky notes H set in the sticky note tray 30 after the pick-up roller 31 is faced against the roll-up position 40. In this state, the pick-up roller 31 is moved to the printing position 41 by the roller arm 33. Then, between the pick-up roller 31 moved to the printing position 41 and the thermal head 32, the sticky note H1 rolled up and the ink ribbon R paid out from the mounted ribbon cartridge 34 are interposed, thereby a desired printing is performed in which the thermal head 32 thermal-transfers ink of the ink ribbon R on the sticky note H1 transmitted towards the ejecting slot 21 by a rotation of the pick-up roller 31.

The controller 12 includes a CPU 50, a ROM 51 and a RAM 52. The ROM 51 stores control programs such as an image rotation program (an image rotation device) by which a formed image data, are rotated and includes image data storage portion in which data such as device drivers, etc., for driving the sticky note printer 4 (especially, the printing assembly 11) are stored and an image data sent from the personal computer 5 are stored and saved. The CPU 50 executes the program stored in the ROM 51, and the RAM 52 serves as an operation area for processing various programs.

When the image data is sent from the personal computer 5, the image data is stored and saved in the image data storage portion, and the image rotation program is executed in the processing area of the RAM 52 by the CPU 50, thereby the sent image data being rotated. Then, the CPU 50 causes the printing assembly 11 to drive based on the device driver stored in the ROM 51, and proceeds to a printing process on the sticky note H1 based on the rotated image data.

As shown in FIGS. 1 and 5, the personal computer 5 has a computer body 60, a set of a keyboard 61 and a mouse 62 connected to the computer body 60 for inputting data, and a display 63 for displaying an inputted result, etc. The computer body 60 has a CPU 70, a ROM 71, a RAM 72, an HDD 73, and a CD drive 74. A CD-ROM 75 storing data of an image data forming application (an image forming device), etc., for forming the image data to be printed on the sticky note H1 is set detachably in the CD drive 74. The CPU 70 executes programs in the HDD 73, the RAM 52 is used as an operation area for processing various programs, and the ROM 71 stores a control program, etc., for controlling the personal computer 5. The HDD 73 of the personal computer 5 stores various data and programs installed from the CD-ROM 75. Therefore, the CPU 70 transfers and executes the image data forming application stored in the HDD 73 in the processing area of the RAM 72 to execute the application. In a state that the image data forming application is activated, when various detecting signals, commands, data, etc., are inputted from the keyboard 61 or the mouse 62, etc., the CPU 70 processes various data according to various programs based on the image data forming application to form the image data.

Figure 6:
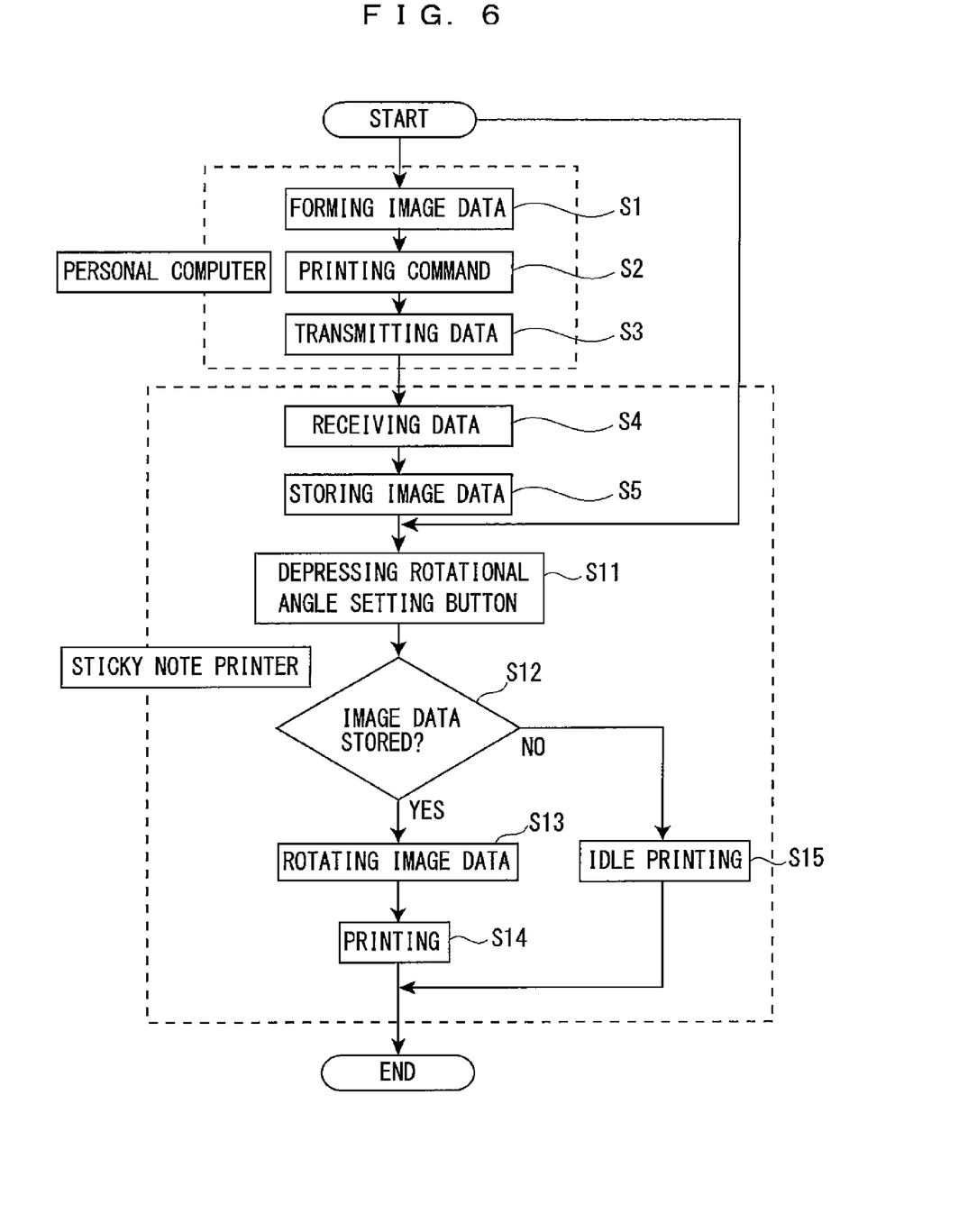
FIG. 6 is a flowchart regarding a rotation of an image data and a printing on the sticky note by the sticky note printing system.

Referring to FIG. 6, a series of operations will be explained herein below, in which a print image G is printed on the sticky note H1 by the sticky note printer 4 based on the image data formed by the image data forming application. First of all, the image data forming application is activated to form the image data by cooperating with the CPU 70, the ROM 71 and the RAM 72 (S1). After the desired image data is formed, a printing command is outputted (S2). The formed image data is transmitted to the sticky note printer 4 via the USB cable 8 from the personal computer 5 (S3). The image data received by the sticky note printer 4 is stored and saved in the image data storage portion in the ROM 51 of the sticky note printer 4 (S4 and S5). Then, a desired rotational angle setting button 24 of the sticky note printer 4 is depressed (S1). At this time, as the rotational angle setting button 24 also serves as an printing button as described above, a printing on the sticky note H1 is begun by depressing one of the rotational angle setting buttons 24. Next, the sticky note printer 4 determines whether the image data is saved in the image data storage portion (S12). When the image data is saved, the image data is rotated by the above image rotation program by user's depression on the rotational angle setting button 24 (S13), and the sticky note H1 is printed based on the rotated image data (S14). On the other hand, when the image data is not saved in the ROM 51, the printing is not performed (an idle printing is performed), and the sticky note H1 on which nothing is printed is ejected (S15). Note that, as shown in FIG. 6, when the image data is stored in the image data storage portion, the sticky note printer 4 of the embodiment is configured such that the printing on the sticky note H1 can be performed only by depressing the rotational angle setting button 24. At this time, an existence and nonexistence of the image data are determined in S12 because the image data storage portion is rewrited or deleted arbitrarily by the user.

Figure 7A:
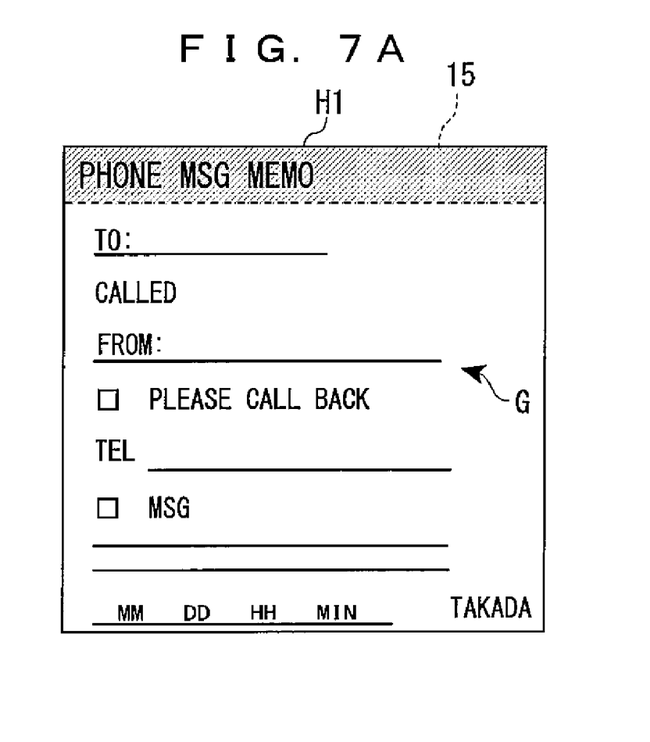
FIGS. 7A to 7D are schematic diagrams of sticky notes printed thereon.
Figure 7B:
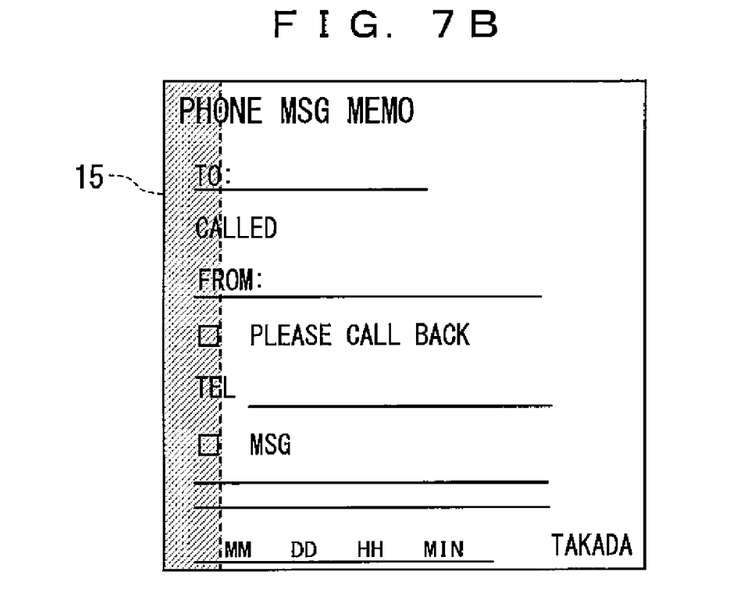
Figure 7C:
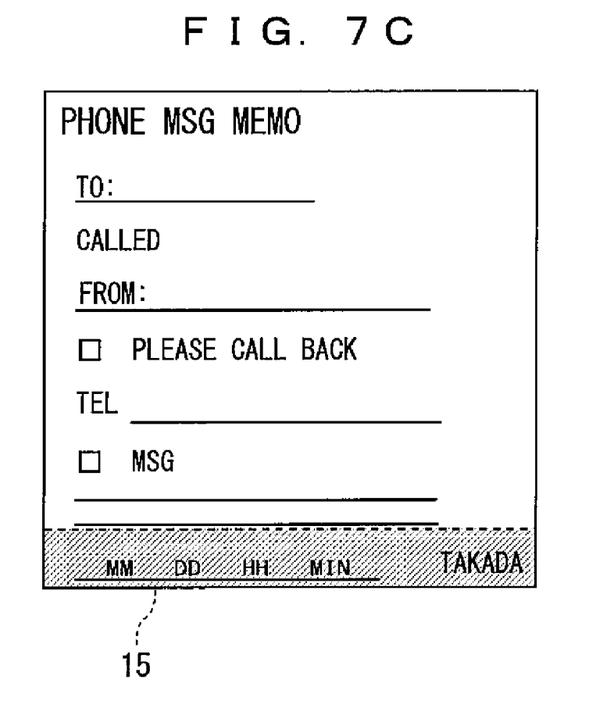
Figure 7D:
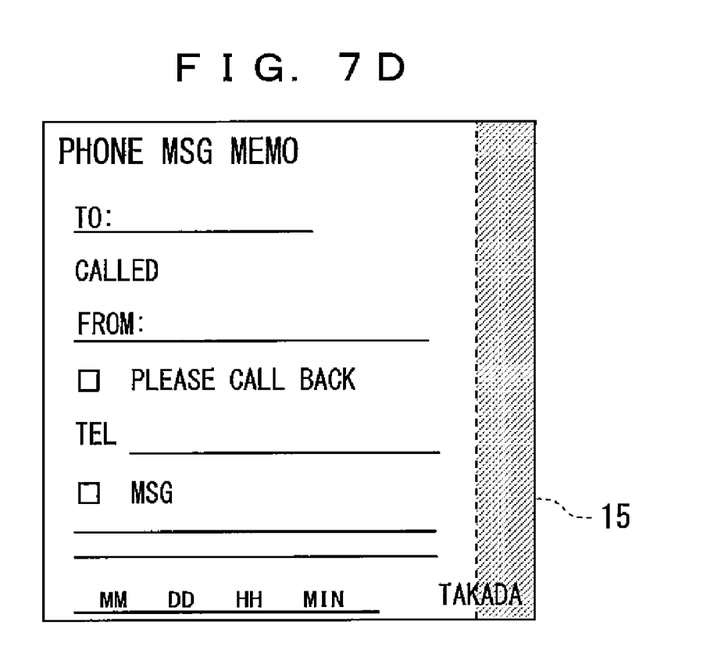

As shown in FIGS. 7A to 7D, in connection with a posted configuration of the sticky note H1, one of the rotational angle setting buttons 24 corresponding to the posted position which the user preliminary desires is depressed, a desired print image G is printed on the sticky note H1, with the read position corresponding to each of the rotational angle setting buttons 24 depressed. As shown in FIG. 7A, an image of the rotated print image G rotated based on the print image G will be explained, when the glued portion 15 of the sticky note H1 is designated on the top side in the figures. For example, a configuration described in FIG. 7B can be obtained by rotating and printing the print image G by 90 degrees with the depression of the rotational angle setting button 24. When the print image G is rotated by 180 degrees from the state shown in FIG. 7A by depressing a corresponding rotational angle setting button 24 and is printed, a configuration described in FIG. 7C can be obtained. Further, when the print image G is rotated by 270 degrees from the state shown in FIG. 7A by depressing a corresponding rotational angle setting button 24 and is printed, a configuration described in FIG. 7D can be obtained. The print image G having a normal read position with respect to the glued portion 15 can always be printed by rotating the print image G as explained above. When the sticky note H1 is approximately square, it is possible to print such that the print image G is in the sticky note H1 without protruding the print image G over the edges of the sticky note H1, even if the print image G is rotated.

According to the configuration described above, it is possible to rotate the image data formed with the image data forming application by the image rotation program. Therefore, even if the posted position of the sticky note H1 is changed, it is possible to obtain the normal read position of the print image G by rotating the image data before printing and by printing the print image G on the sticky note H1 based on the rotated image data. In other words, it is possible to print by matching the read position of the print image G to be printed on the sticky note H1 with the posted position of the sticky note H1.

Next, referring to FIGS. 8 and 9, a sticky note printing system 1 according to the second embodiment will be explained. To avoid a duplicate description, only different portions will be explained. In the sticky note printing system 1, a rotational angle setting menu 80 is provided in an image data forming application stored in a personal computer 5 in place of the rotational angle setting buttons 24 provided in the sticky note printer 4, and a printing button is provided in the sticky note printer 4. Also, an image rotation program stored in a ROM 51 of the sticky note printer 4 is stored in an HDD 73 of a personal computer 5.

Figure 8:
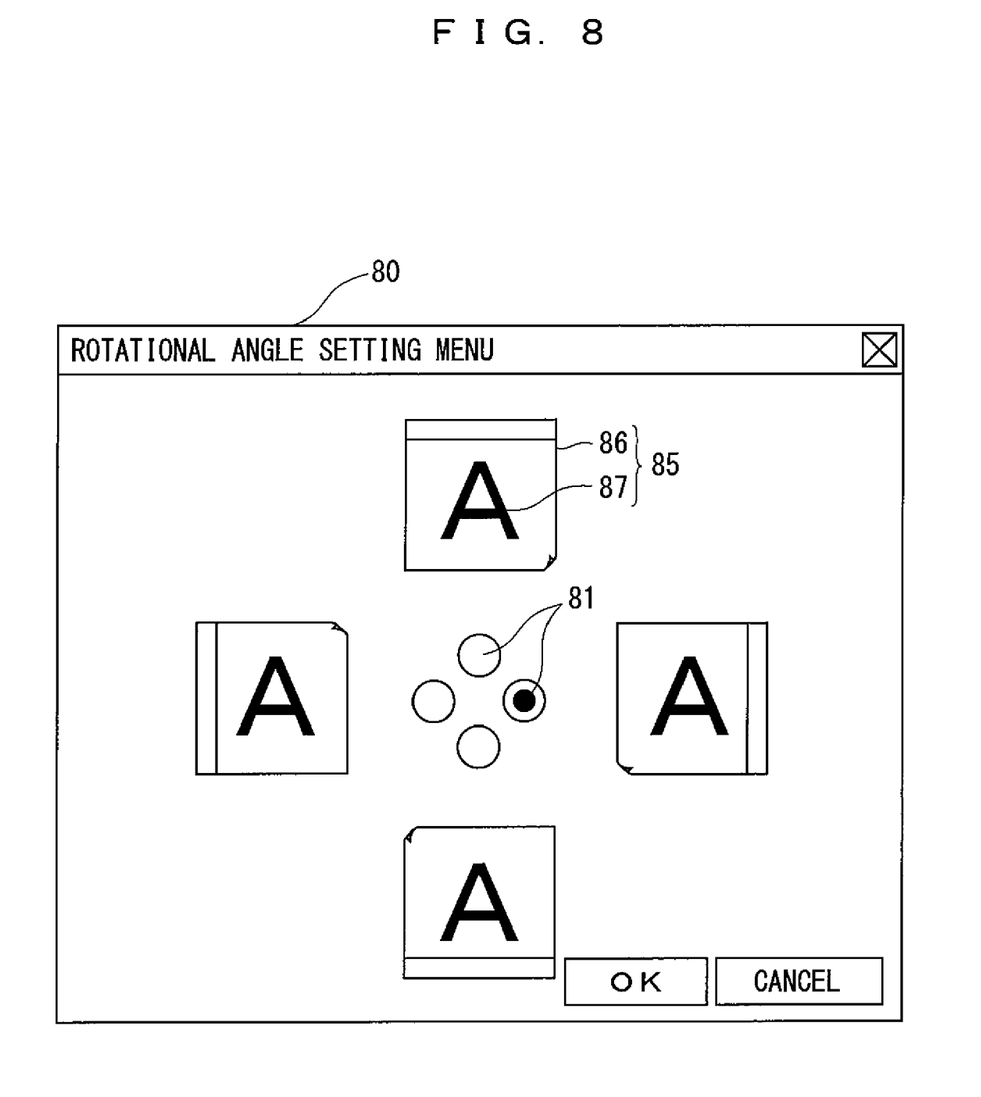
FIG. 8 is a schematic diagram of a rotational angle setting menu in the sticky note printing system according to the second embodiment.

As shown in FIG. 8, the rotational angle setting menu 80 includes four radio buttons 81 arranged at the top, the down, the left and the right around the center, and four image pictures 85 arranged at the outer side of each of the radio buttons 81 and show pictures printed on the sticky note H1. As each of the above described marks 25, each of the image pictures 85 includes a sticky note image 86 having a posted position corresponding to each of the radio buttons 81, and a picture image 87 arranged to be in a normal read position with respect to the sticky note image 86.

Figure 9:
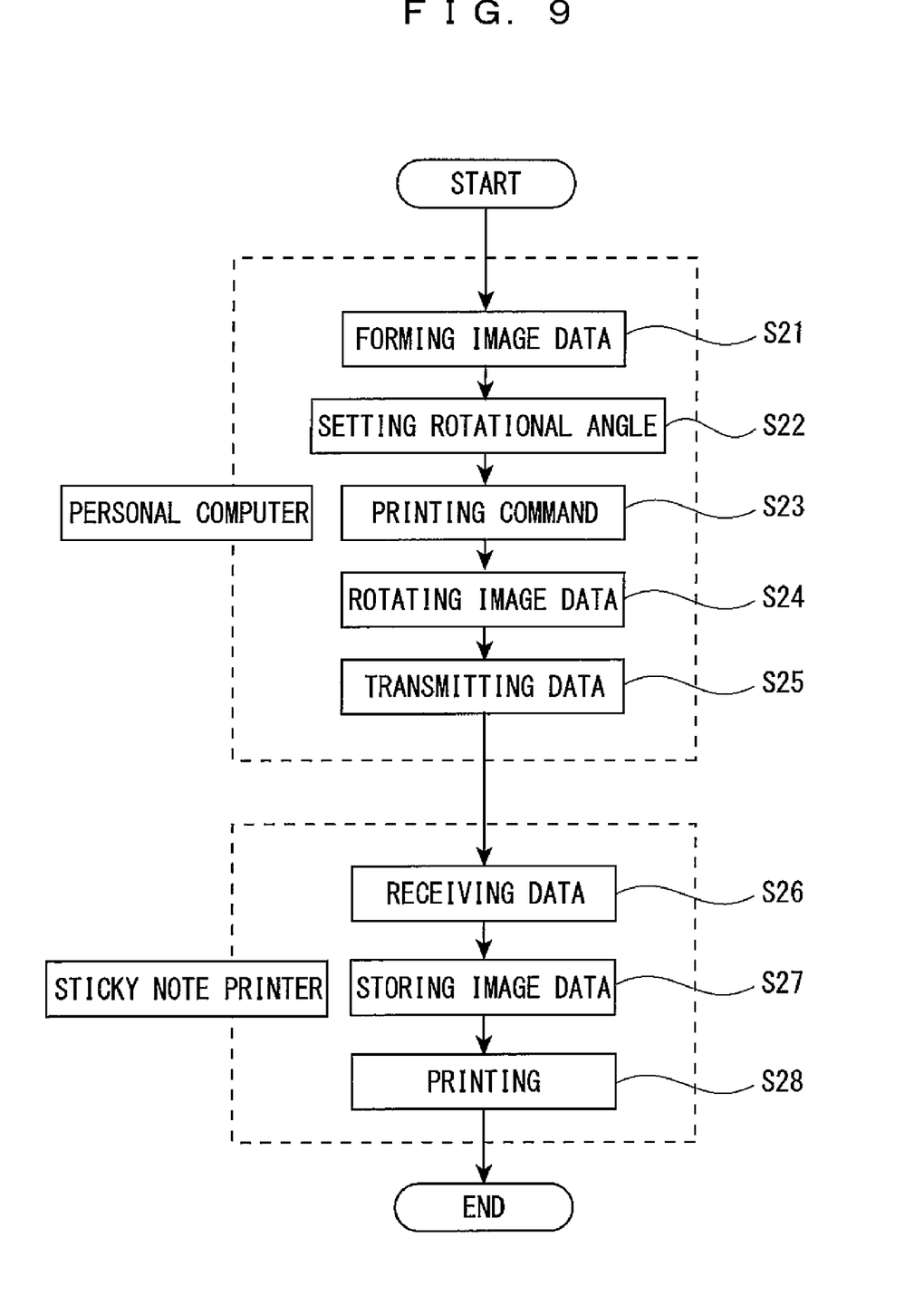
FIG. 9 is a flowchart regarding a rotation of the image data by the sticky note printing system according to the second embodiment.

Referring to FIG. 9, a series of operations for rotating the image data with the rotational angle setting menu 80 and printing the print image G on the sticky note H1 based on the rotated image data will be explained herein below. First of all, the image data forming application is activated to form the image data by cooperating with a CPU 70, a ROM 71 and a RAM 72 (S21). After the image data is formed, the rotational angle setting menu 80 is displayed, and a rotational angle is set by depressing a desired radio button 81 (S22). Then, when a printing command is outputted (S23), the formed image data is rotated by the rotational angle corresponding to the selected radio button 81 by the image rotation program (S24). Concurrently, rotated image data is transmitted to the sticky note printer 4 from the personal computer 5 via a USB cable 8 (S25). When the image data is received by the sticky note printer 4 (S26), the sticky note printer 4 stores and saves the image data in an image data storage portion (S27). Then, when the user depresses the printing button, a printing assembly 11 is driven by the above mentioned device driver, and the sticky note H1 is printed based on the image data (S28). With the above described configuration, as the image data formed by the image data forming application can be rotated by the image rotation program, it is possible to match a read position of the print image G to be printed on the sticky note H1 with a posted configuration of the sticky note H1 to print.

Figure 10:
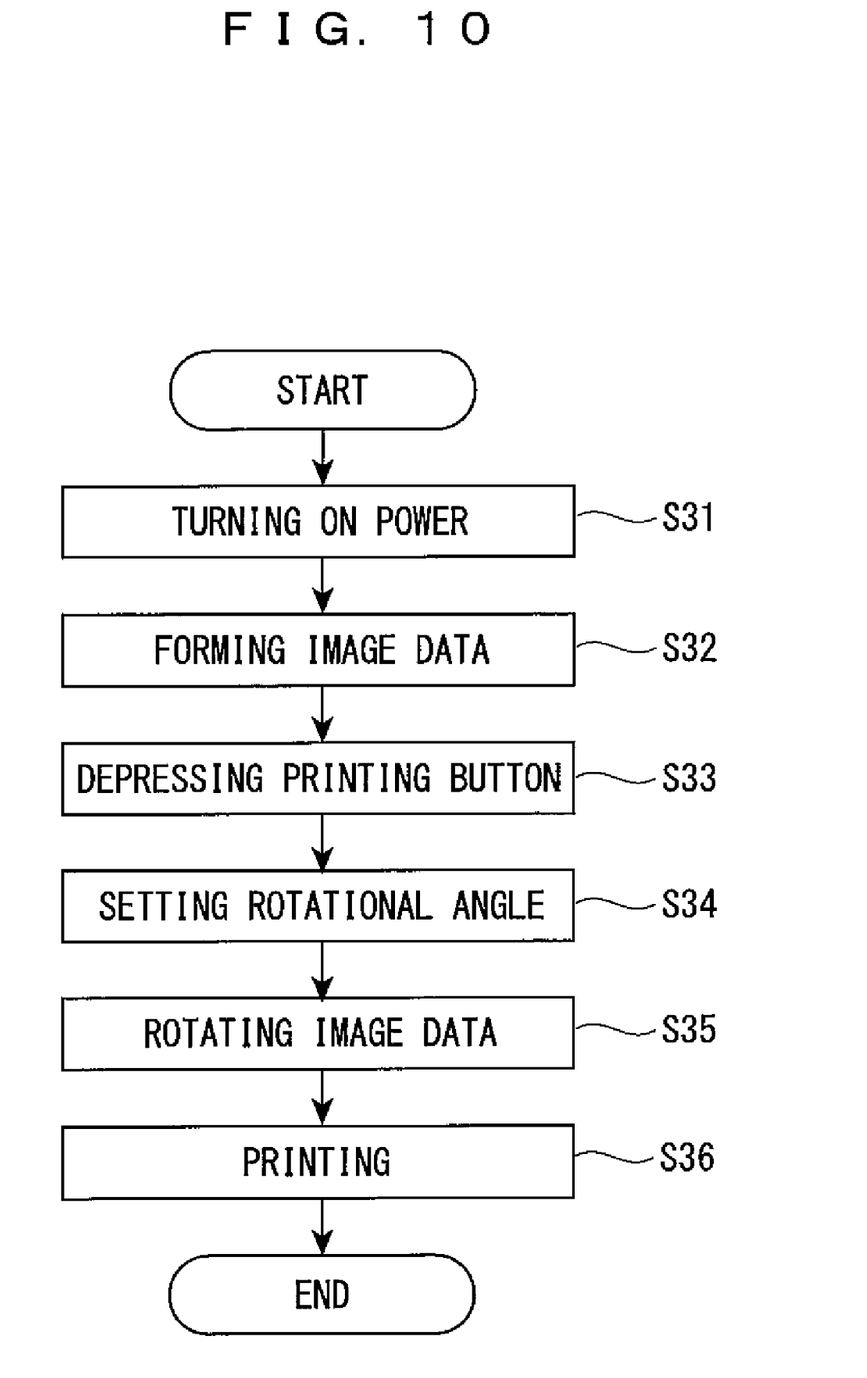
FIG. 10 is a flowchart regarding a rotation of the image data by the sticky note printer.

Referring to FIG. 10, an explanation will be made for achieving the sticky note printing system 1 above only with the sticky note printer 4. Though not shown in the figure, the sticky note printer 4 has an input apparatus such as a keyboard, etc., an output apparatus such as a display, etc., and stores the image data forming application and an image rotation program in a ROM. Also, the keyboard includes rotational angle setting buttons.

As shown in FIG. 10, when the sticky note printer is activated (S31), the image forming menu of the image data forming application is displayed on the display. In this state, the image data is formed by inputting desired data with the keyboard (S32). Then, when a printing button on the keyboard is depressed (S33), the rotational angle setting menu is displayed on the display and the user depresses a desired rotational angle setting button (S34). The formed image data is rotated by the image rotation program based on the depressed rotational angle setting button (S35). The printing assembly prints the print image G on the sticky note H1 based on the rotated image data (S36).

Figure 11:
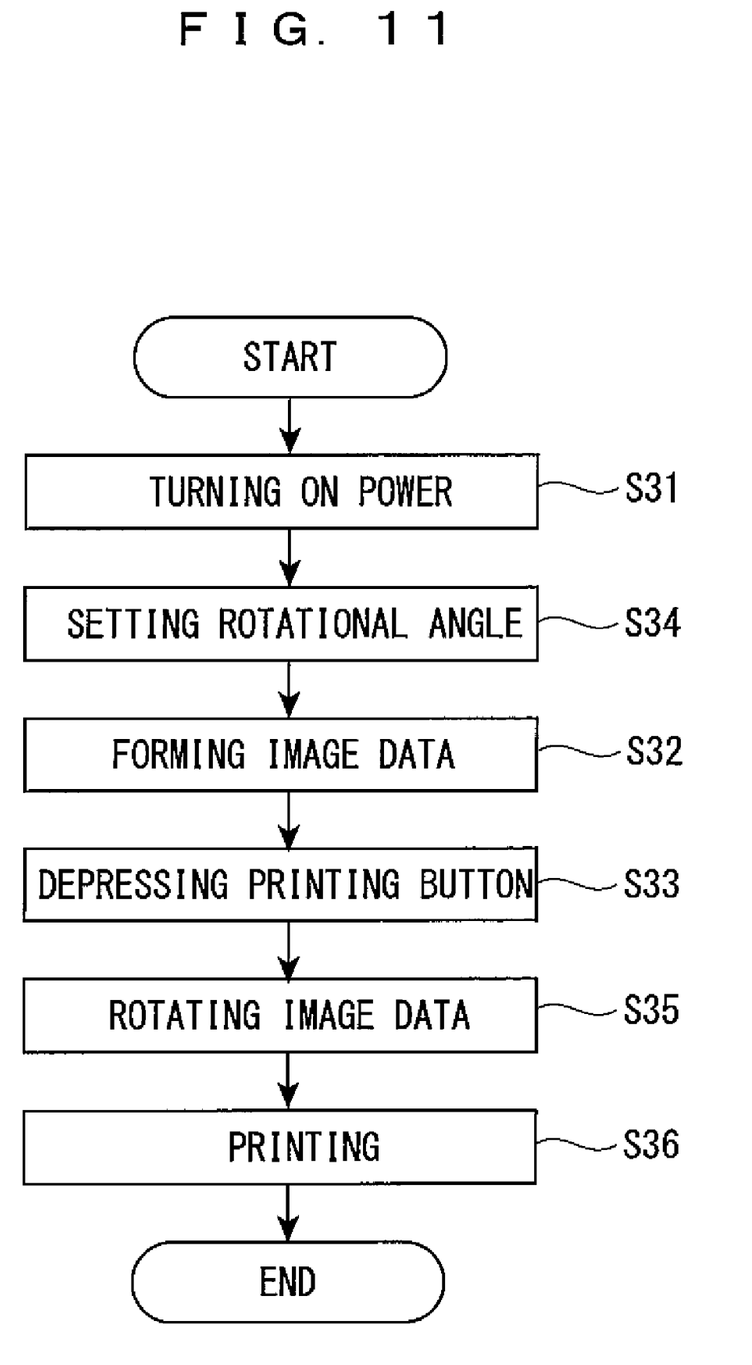
FIG. 11 is a flowchart regarding the rotation of the image data by a modified sticky note printer.

With the configuration above, as the image data formed by the image data forming application can be rotated by the image rotation program, it is possible to match the read position of the printing image G to be printed on the sticky note H1 with the posted configuration of the sticky note H1 to print. In this configuration, the image data is rotated after the image data have been formed, but, as shown in FIG. 11 as a modified example, it is also possible that the rotational angle of the image is preliminary set, and then, the image data is formed. With this procedure, it is possible to form the image data matched with the posted position of the sticky note H1.

What is claimed is:

1. A sticky note printing system comprising:
    a sticky note printer that prints on a topmost sticky note of a bundle of sticky notes formed by laminated sticky notes, of which one ends are glued to be peeled off each other;
    an image forming apparatus that forms an image data to be printed on the sticky note, the image forming apparatus having an image forming device that forms the image data,
    an image rotation device that rotates the formed image data by a predetermined angle; and
    a rotational angle setting device that sets a rotational angle of the image data to be rotated by the image rotation device with respect to a glued portion of the sticky note, the sticky note printer having a printing device that prints based on rotated image data.

2. The sticky note printing system according to claim 1, wherein the rotational angle setting device sets a printed position of a printed image to be printed based on the image data at an angle of 0 degree, 90 degrees, 180 degrees, or 270 degrees as the rotational angle with respect to a set position of the sticky note set in the sticky note printer, and the bundle of sticky notes is formed approximately square in plan view.

3. The sticky note printing system according to claim 1, wherein the sticky note printer further has a storage portion which stores and saves the image data.

4. A sticky note printer comprising:
    an image forming device that forms an image data to be printed on a topmost sticky note of a bundle of sticky notes formed by laminated sticky notes, of which one ends are glued to be peeled off each other;
    an image rotation device that rotates the formed image data by a predetermined angle, the predetermined angle being set with respect to a glued portion of the sticky note; and
    a printing device that prints based on the image data rotated by the image rotation device.

5. The sticky note printer according to claim 4, wherein it further has a storage portion which stores and saves the image data.

6. A method of printing on a sticky note comprising steps of:
    forming an image data to be printed on a topmost sticky note of a bundle of sticky notes formed by laminated sticky notes, of which one ends are glued to be peeled off each other;
    rotating the formed image data by a predetermined angle, the predetermined angle being set with respect to a glued portion of the sticky note; and
    printing based on the image data rotated by the image rotation step.

7. A method of printing on a sticky note comprising steps of:
    forming an image data to be printed on a sticky note of which one end is glued to be peeled off;
    rotating the formed image data by a predetermined angle, the predetermined angle being set with respect to a glued portion of the sticky note; and
    printing based on the image data rotated by the image rotation step.

* * * * *